US011070838B2

(12) United States Patent
Robert et al.

(10) Patent No.: US 11,070,838 B2
(45) Date of Patent: Jul. 20, 2021

(54) MOTION COMPENSATION AT A FINER PRECISION THAN MOTION VECTOR DIFFERENTIAL

(71) Applicant: INTERDIGITAL VC HOLDINGS, INC., Wilmington, DE (US)

(72) Inventors: Antoine Robert, Cesson-Sevigne (FR); Fabrice Leleannec, Cesson-Sevigne (FR); Simon Danten, Rouvroy-en-santerre (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/642,566

(22) PCT Filed: Aug. 31, 2018

(86) PCT No.: PCT/US2018/049011
§ 371 (c)(1),
(2) Date: Feb. 27, 2020

(87) PCT Pub. No.: WO2019/046674
PCT Pub. Date: Mar. 7, 2019

(65) Prior Publication Data
US 2020/0195956 A1 Jun. 18, 2020

(30) Foreign Application Priority Data
Sep. 1, 2017 (EP) .................................. 17306131

(51) Int. Cl.
*H04N 19/52* (2014.01)
*H04N 19/176* (2014.01)
*H04N 19/523* (2014.01)

(52) U.S. Cl.
CPC ........... *H04N 19/52* (2014.11); *H04N 19/176* (2014.11); *H04N 19/523* (2014.11)

(58) Field of Classification Search
CPC ..... H04N 19/521; H04N 19/523; H04N 19/53
See application file for complete search history.

(56) References Cited

U.S. PATENT DOCUMENTS 9,538,180 B2    1/2017  Zhang et al.
2010/0290530 A1* 11/2010  Huang ................. H04N 19/587
                                               375/240.16

(Continued)

FOREIGN PATENT DOCUMENTS

GB      2539213       12/2016
WO   WO2013053309     4/2013

(Continued)

OTHER PUBLICATIONS

Chen, et al., Algorithm Description of Joint Exploration Test Model 6 (JEM 6), Joint Video Exploration Team (JVET) of ITU-T SG 16 WP 3 and ISO/IEC JTC 1/SC 29 1WG 11 6th Meeting; Hobart, AU, Mar. 31-Apr. 7, 2017, Documents: JVET-F1001-v2.

(Continued)

*Primary Examiner* — Jayanti K Patel
*Assistant Examiner* — Christopher Kingsbury Glover
(74) *Attorney, Agent, or Firm* — Jamie T. Nguyen

(57) ABSTRACT

Extra precision can be added to motion vectors, such as those obtained using advanced motion vector prediction or frame rate upconversion, to produce improved motion compensation. The increased precision from neighboring blocks are used to provide increased precision to a motion vector for a current block. In various embodiments, the derivation of the increased precision can be found through various methods. In other embodiments, refined motion vectors can be saved for use in subsequent predictions, and a rate distorion optimized selection can be performed for determining whether or not to use the refinement.

20 Claims, 13 Drawing Sheets

SUB-BLOCKS PROCESSING

Sub-block template matching

Full CU refined MV

(56) References Cited

U.S. PATENT DOCUMENTS

2015/0195562 A1\* 7/2015 Li .................. H04N 19/53
　　　　　　　　　　　　　　　　　　375/240.02
2018/0098089 A1\* 4/2018 Chen ............... H04N 19/157
2020/0195925 A1\* 6/2020 Robert ............. H04N 19/583

FOREIGN PATENT DOCUMENTS

WO　WO2015106126　7/2015
WO　WO2017052000　3/2017

OTHER PUBLICATIONS

Chen, et al., Algorithm Description of Joint Exploration Test Model 6 (JEM6), Joint Video Exploration Team (JVET) of ITU-T SG WP 3 and ISO/IEC JTC 1/SC 29/WG 11, 6th Meeting, Hobart, AU, Mar. 31-Apr. 7, 207, JVET-F1001-v3.

Li et al., An Optimally Scalable and Cost-Effective Fractional-Pixel Motion Estimation Algorithm for HEVC, 2013 IEEE International Conferenced on Acoustics, Speech and Signal Processing (ICASSP), Vancouver, British Columbia, May 26-31, 2013, IEEE, Piscataway, NJ, US, May 26, 2013, pp. 1399-1403.

Chen, et al., Algorithm Description of Joint Exploration Test Model 7 (JEM7), 7. JVET Meeting, Jul. 13, 2017- Jul. 21, 2017, Torino, The Joint Video Exploration Team of ISO/IEC JTC1/SC29/WG11 and ITU-T SG.16, URL: http://phenix.int-evry.fr/jvet/, No. JVET-G1001, Aug. 19, 2017.

\* cited by examiner

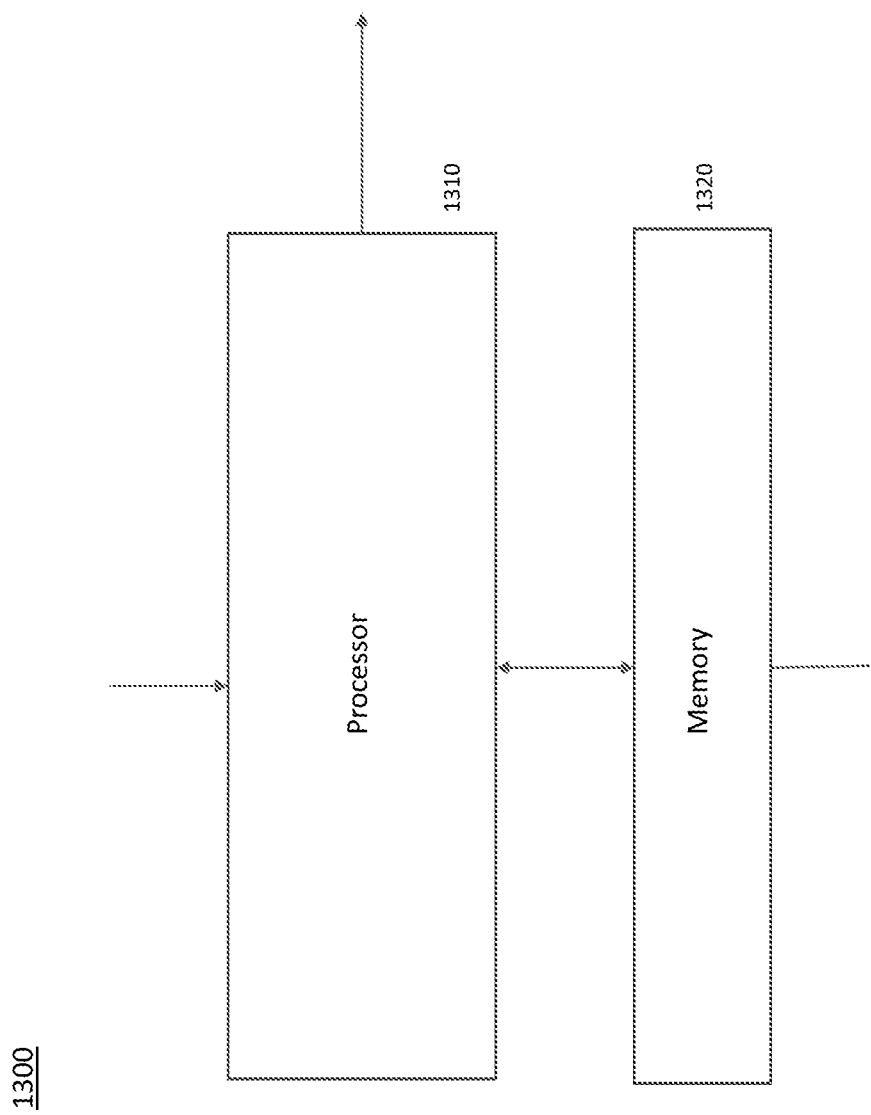

MOTION COMPENSATION AT A FINER PRECISION THAN MOTION VECTOR DIFFERENTIAL

FIELD OF THE INVENTION

The following described aspects relate to the field of video compression.

BACKGROUND OF THE INVENTION

In the HEVC (High Efficiency Video Coding of International Telecommunication Union, ITU-T H.265) video compression standard, a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CTU is represented by a Coding Tree in the compressed domain. This is a quad-tree division of the CTU, where each leaf is a Coding Unit (CU), as shown in FIG. 1.

Motion compensated temporal prediction is employed to exploit the redundancy that exists between successive pictures of a video. To do so, a motion vector is associated with each prediction unit (PU). Each CU is then given some Intra or Inter prediction parameters (Prediction Info) and is spatially partitioned into one or more Prediction Units (PUs), each PU being assigned some prediction information. The Intra or Inter coding mode is assigned on the CU level, as shown in FIG. 2.

In HEVC, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

Exactly one Motion Vector is assigned to each PU in HEVC. This motion vector is used for motion compensated temporal prediction of the considered PU.

In the Joint Exploration Model (JEM) developed by the JVET (Joint Video Exploration Team) group, a CU is no longer divided into PU or TU, and some motion data is directly assigned to each CU. In this new codec design, a CU can be divided into sub-CU and a motion vector can be computed for each sub-CU.

In HEVC, motion vector accuracy is one-quarter pel (one-quarter luma sample and one-eighth chroma sample for 4:2:0 video). In the JEM, the accuracy for the internal motion vector storage has been increased to $\frac{1}{16}$-pel. This higher motion vector accuracy ($\frac{1}{16}$-pel) is used in motion compensation inter prediction for the CU coded with a Skip/Merge mode. In High Efficiency Video Coding (HEVC), advanced motion vector prediction (AMVP) is used to predict a current motion vector. AMVP employs competition-based selection from a given candidate set, including both the spatial and temporal motion vectors. For the CUs coded with an AMVP mode, either the integer-pel or quarter-pel motion is used.

The present embodiments aim to refine motion vectors of CUs coded with an AMVP mode from either the integer-pel or qua rter-pel precision to the finest accuracy of the coder/decoder, currently $\frac{1}{16}$-pel, during the motion compensation inter prediction process.

SUMMARY OF THE INVENTION

These and other drawbacks and disadvantages of the prior art are addressed by at least one of the described embodiments, which are directed to a method and apparatus for improving the compression efficiency of video encoders and decoders through increased precision of motion vectors.

In at least one embodiment, it is proposed to increase the precision of motion vectors using increased precision from neighboring motion vectors to increase the overall compression performance of the considered video codec.

According to at least one general embodiment described herein, there is provided a method for coding a block of video data. The method comprises steps for deriving an additional precision value for a motion vector for a block of video data from at least one neighboring block previously encoded; refining the motion vector by assigning to it the additional precision value; performing motion compensation for the block of video data by using the refined motion vector; and, encoding the motion compensated block of video data.

According to another embodiment described herein, there is provided a method for decoding a block of video data. The method comprises steps for deriving an additional precision value for a motion vector for a block of video data from at least one neighboring block previously decoded; refining the motion vector by assigning to it the additional precision value; performing motion compensation for the block of video data by using the refined motion vector; and, decoding the motion compensated block of video data.

According to another aspect described herein, there is provided apparatus for coding or decoding a block of video data, comprising: a memory, and a processor, configured to perform: deriving an additional precision value for a motion vector for a block of video data from at least one neighboring block previously reconstructed/decoded; refining the motion vector by assigning to it the additional precision value; performing motion compensation for the block of video data by using the refined motion vector; and, encoding or decoding the block of video data. The apparatus can execute any of the aforementioned method embodiments with variations.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

According to another aspect described herein, there is provided a method for increasing the precision of motion vectors by using the aforementioned methods on sub-blocks that are smaller than a block and subsequently performing motion compensation as a combination of several sub-block motion compensations.

According to another aspect described herein, there is provided a method for increasing the precision of motion vectors by using the aforementioned methods on sub-blocks that are smaller than a block and using different refinement techniques for different sub=blocks and subsequently performing motion compensation as a combination of several sub-block motion compensations.

According to another aspect described herein, there is provided a method for increasing the precision of motion vectors by combining the techniques of refining a motion vector for an entire block, such as a coding unit, and making sub-block motion vector refinements and subsequently performing motion compensation.

According to another aspect described herein, there is provided a method for using the aforementioned methods and, additionally, internally storing the refined motion vectors with their increased precision for use in subsequent predictions.

According to another aspect described herein, there is provided a method for using the aforementioned methods and, additionally, determining whether to use the refinement and/or saving process according to a criteria, such as a rate distortion measurement on an encoding side.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 13 shows one embodiment of an apparatus for encoding or decoding using the aspects described.

DETAILED DESCRIPTION

In the HEVC video compression standard, a picture is divided into so-called Coding Tree Units (CTU), with typical sizes of 64×64, 128×128, or 256×256 pixels.

Figure 1:
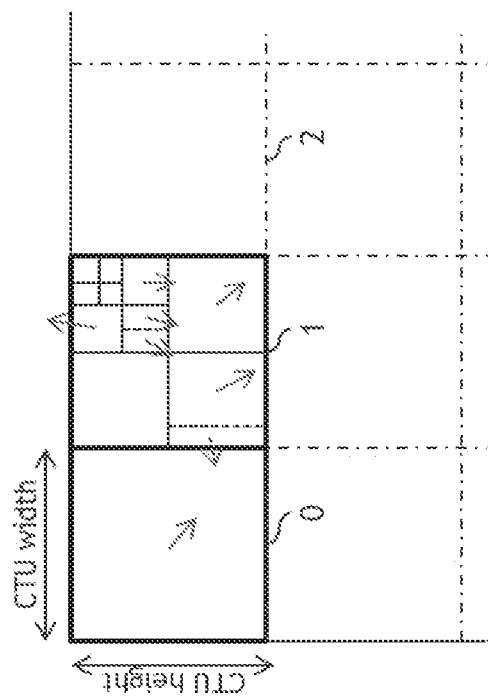
FIG. 1 shows an example of a coding tree unit and coding tree concepts to represent a compressed HEVC picture.

Each CTU is represented by a Coding Tree in the compressed domain. This is a quad-tree division of the CTU, where each leaf is called a Coding Unit (CU), see FIG. 1.

Figure 2:
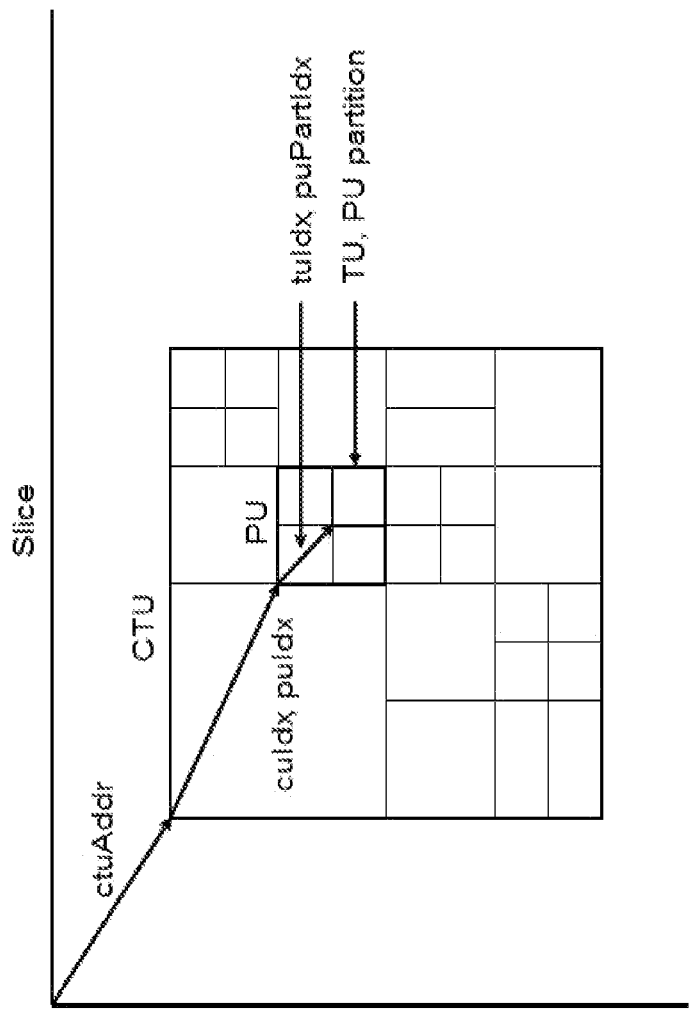
FIG. 2 shows an example of division of a coding tree unit into coding units, prediction units, and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain to represent picture data in a more flexible way in the compressed domain. The advantage of this flexible representation of the coding tree is that it provides increased compression efficiency compared to the CU/PU/TU arrangement of the HEVC standard.

In the state-of-the-art approach, CUs that are coded with an AMVP mode use either an integer-pel or a quarter-pel accuracy for the motion compensation due to the precision of motion vector differential signaling. Those AMVP modes cannot benefit from the increased precision of the motion compensation process.

One objective of the described embodiments is to refine the Motion Vector of CUs coded with an AMVP mode during the motion compensation inter prediction.

The proposed invention comprises, among other features:
1. Refining the motion vector of CUs coded with the classical AMVP mode from either integer- or quarter-pel to the finest (1/16-pel) accuracy. [encoder/decoder]
2. Saving the refined motion vectors for further predictions. [encoder/decoder]
3. Choosing/Signaling/Decoding with a RDO loop between classical motion vector and refined ones. [encoder/decoder]

Figure 3:
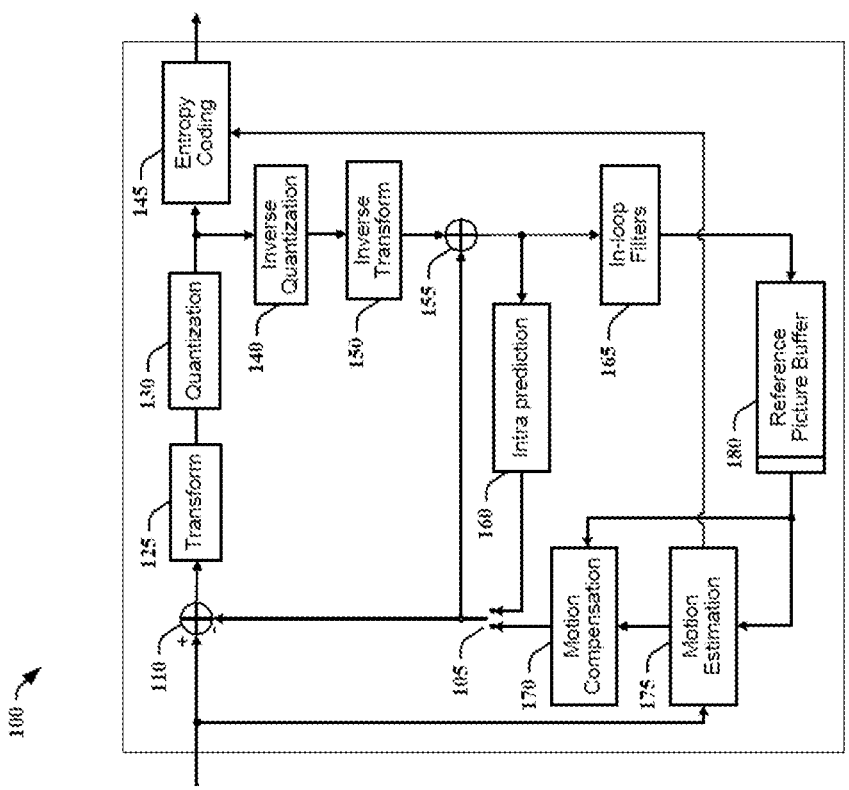
FIG. 3 shows one example of a generic video compression scheme to which the present embodiments can be applied.

FIG. 3 shows one example of a generic video compression scheme to which the present embodiments can be applied at an encoder 100. In the encoder 100, a picture may be encoded by the encoder elements which include a switch 105, an adder 110, a transform component 125, a quantization component 130, an inverse quantization component 140, an inverse transform component 150, an adder 155, an intra prediction component 160, in-loop filters 165, a motion compensation component 170, a motion estimation component 175, and a reference picture buffer 180.

Figure 4:
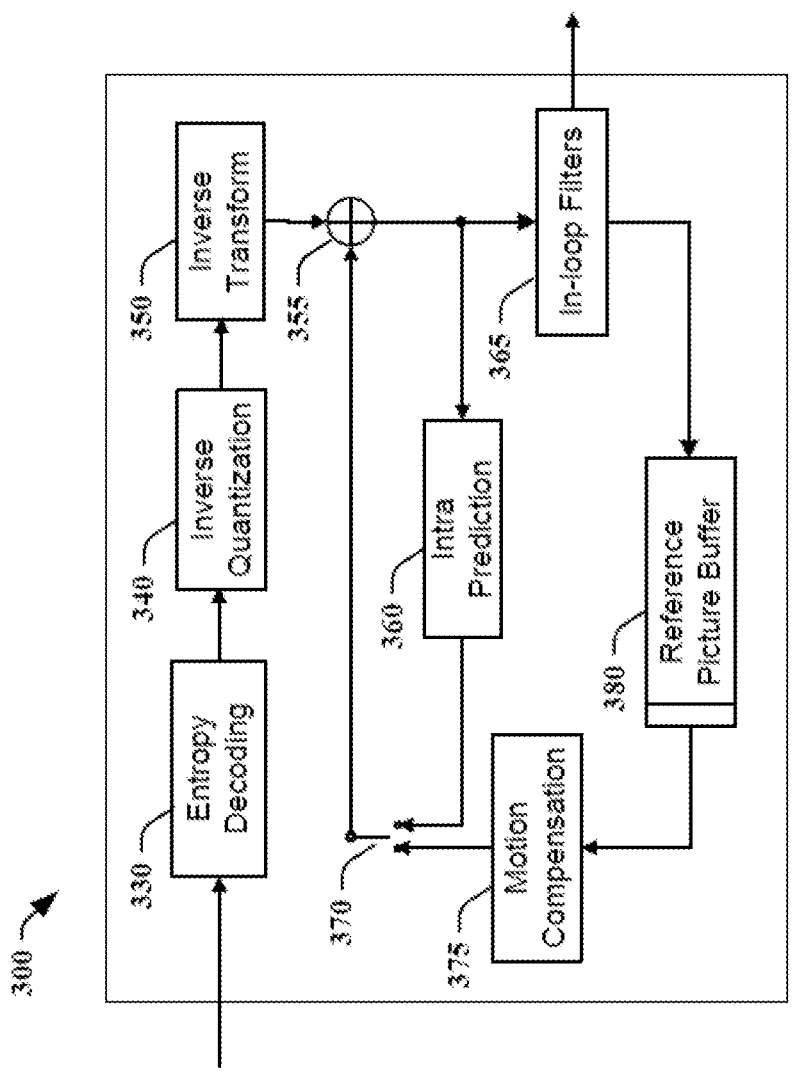
FIG. 4 shows one example of a generic video decompression scheme to which the present embodiments can be applied.

FIG. 4 shows one example of a generic video decompression scheme to which the present embodiments can be applied at a decoder 300. In the decoder 300, a bitstream may be decoded by the decoder elements which include an entropy decoding component 330, an inverse quantization component 340, an inverse transform component 350, an adder 355, an intra prediction component 360, in-loop filters 365, a switch 370, a motion compensation component 375, and a reference picture buffer 380.

Those skilled in the art should understand the operations and/or processes performed by the encoder elements and decoder elements shown in FIGS. 3 and 4.

The codec modules that are impacted are the motion compensation 170 and the motion estimation 175 of FIGS. 3 and 275 of FIG. 4. Entropy coding 145 and entropy decoding 230 are also modified in that an AMVP refinement on/off flag is signaled in the bit-stream.

The improvement of the AMVP motion compensation allows refinement at a sub-block level of the incoming AMVP motion vector from integer- or ¼-pel accuracy to 1/16-pel accuracy using neighboring information.

Figure 5:
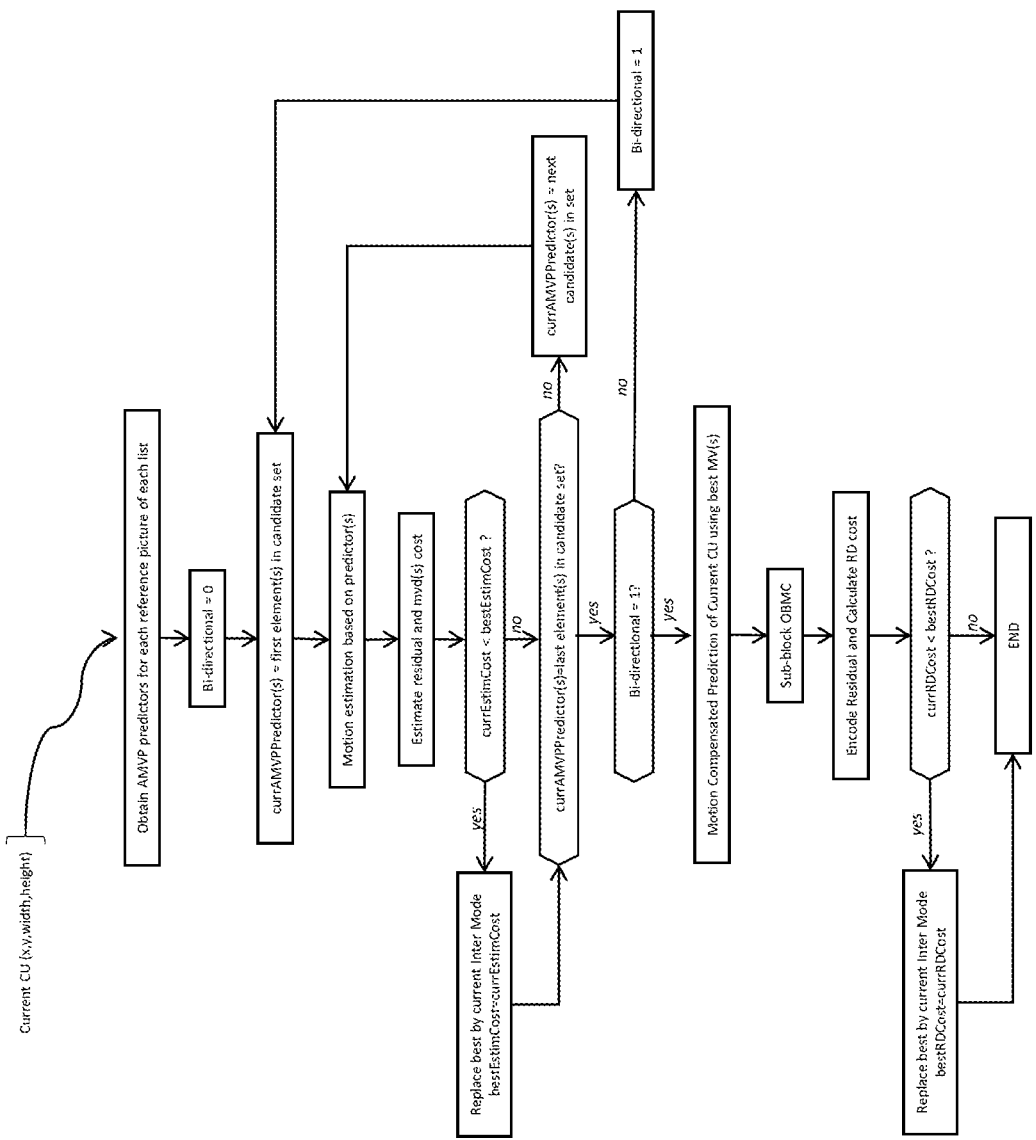
FIG. 5 shows an example prior art AMVP (advanced motion vector prediction) process of an inter-prediction coding unit.

The prior art overall process to predict a motion vector of a current CU in the AMVP mode is depicted in FIG. 5.

The input to this process is the current Coding Unit for which one wants to generate the best motion vector associated with a reference picture.

The first step comprises collecting the candidates used to predict the motion vector of a current CU. For each reference picture of each available reference picture list, up to two motion vector predictors are extracted from spatial or temporal neighboring positions.

Then, for each of these AMVP predictors, a motion estimation is performed to get the best motion vector for the current CU, for example, the one that produces the minimum SAD (Sum of Absolute Differences) between the current CU and its prediction. These steps are performed once with uni-directional prediction, using 1 motion vector, then with bi-directional prediction using 2 motion vectors, 1 for each reference picture list. Each motion estimation allows estimation of the residual and motion vector differential cost. The lowest cost gives the best estimated motion vector(s) and its(their) associated reference picture(s).

Once the best estimated motion vector(s) is(are) obtained for a current CU, the temporal prediction takes place, involving motion compensation and then OBMC (Overlapped Block Motion Compensation).

Next, the current CU is coded and reconstructed. The best way to encode a current CU, i.e. with minimum rate distortion cost, is then selected, which provides the coding of the current CU in the AMVP mode.

The best RD cost observed provides the predictor(s) to be used (index(es) in the set is(are) signaled) with its(their) associated reference picture(s) of a reference picture list (reference indexes for each available reference picture list are signaled). The difference between the best estimated motion vector(s) and the predictor(s) gives the motion vector differential(s). The motion vector differential(s) (mvd) is signaled.

The AMVP coding mode is then put into rate distortion competition with other coding modes available for the current CU in the considered video coding system. The presented AMVP process is repeated with ¼-pel and integer-pel precision.

The mvd transmitted is rounded at the selected precision and, to be coherent, AMVP predictors are also rounded at the selected precision.

Some recent improvements in the JEM increases the internal storage of motion vectors to 1/16-pel accuracy.

This higher motion vector precision aims at extending the motion compensation process to such an accuracy (1/16-pel) instead of the old ¼-pel accuracy. Such motion compensation is used in AMVP modes during the motion estimation process and in all modes during CU encoding/decoding processes.

Thus, all coding modes that can produce or derive motion vectors with such a precision can benefit from this more accurate motion compensation:

Affine calculates sub-block MVs based on a model, sub-block MV precision of 1/16-pel, FRUC performs MV refinement through ⅛-pel, and Merge uses (spatial and/or temporal) neighboring MVs whose precision can vary from integer to 1/16-pel accuracy depending on the neighbor coding mode.

A main limitation of the prior art AMVP process is that it systematically rounds motion vector predictors (MVP) at either integer- or ¼-pel precision, and also performs motion estimation with this selected precision. Therefore, this mode cannot take advantage of the increased accuracy of the motion vector storage and the motion compensation.

This section describes the modified AMVP Coding Mode coding/decoding process proposed herein.

In the following a motion vector (MV) or a motion vector predictor (MVP) is composed of an integer part and a fractional part. This fractional part is further divided into the high fractional part and the low one where the boundary is the used precision for AMVP (integer- or ¼-pel). The low fractional part is never used in state-of-the-art AMVP mode.

The described embodiments perform motion vector refinement to improve the motion compensation process, used during motion estimation and motion compensation, for CUs coded in an AMVP mode by taking advantage of the improved motion vector storage accuracy.

In a first embodiment, the motion vector used for the motion compensation of an AMVP CU, at an integer- or ¼-pel precision, is refined towards the finest available precision, such as 1/16-pel, for example. The lower fractional part is filled, in a way reproducible at the decoder side. For example, for an internal precision of 1/16-pel, the refined motion vector can add any values within the range of either [−15/16, 15/16] for integer-pel incoming MV or [−3/16, 3/16] for ¼-pel incoming MV in both direction (x and y). This refined MV is only used during the motion compensation process, then, after the motion compensation has been done, the original MV (at integer- or ¼-pel) is restored for such things as cost estimation, motion vector differential and RDcost calculations, for example.

To do so, it is possible to use neighboring motion vectors, spatial and/or temporal, with their full precision, such that no rounding is applied.

Only one neighbor can be considered: (i) the same as the predictor, (ii) a predefined one (for example, always the spatial left neighbor), (iii) the first encountered one having a precision finer than the incoming MV, (iv) the one having the closest MV to the incoming one, or some other one, or other possibilities. In that case, the low fractional part of this neighboring MV is picked and applied to the current MV.

In a variant, it is also possible to consider several neighbors: (i) the set, or a subset, of classical spatial neighbors, (ii) the first second, or third, or N encountered ones having a precision finer than the incoming MV, (iii) the first second, or third, or N having the closest MV to the incoming one, or some other one, or other possibilities. In this case, the low fractional part of the current incoming MV is filled with the average, the median, or any other combination of the low fractional parts of the considered neighboring MVs.

In a variant, it is also possible to use another tool to perform this refinement. For example, the FRUC tool can achieve such a refinement by using template matching techniques on surrounding blocks of the current CU and reference one in a reproducible manner at the decoder.

In an alternate embodiment, it is possible to divide the current CU into smaller sub-blocks with the same incoming motion vector. The motion compensation is then performed as a combination of several sub-block motion compensations. The sub-block size can be (i) a predefined size (4×4, 8×8, or any size), (ii) a size depending on the CU size or surface (for example, 8×8 for large CUs and 4×4 for smaller ones, or each CU is divided into 4 sub-blocks of at least 4×4 size), or other such sizes. In this variant, the refinement of MV towards the finest precision (1/16-pel) can be achieved for each sub-block independently.

As previously, the sub-block motion vector refinement can be based on one or several spatial and/or temporal neighboring MVs, or on another tool, such as FRUC, when possible, for example.

In another alternate embodiment, it is also possible to use different refinement methods for different sub-blocks. For example, FRUC can be used for the first column and row of sub-blocks, then use several neighbors for the second column and row, and finally using the closest neighboring MV for all following sub-blocks.

In another alternate embodiment, it is possible to combine the two previous approaches, i.e., the entire CU motion vector refinement and the sub-block motion vector refinements. First, the incoming MV can be refined at the entire CU level, then this refined MV can be used as input at the sub-block level, instead of using the incoming MV.

In another embodiment, instead of just calculating refined motion vector(s) for the current AMVP coding unit to improve the motion compensation process, it is also possible to benefit from the increased MV storage precision by saving refined motion vectors for following predictions.

The refined motion vector(s), refined using any of the methods previously described, are internally saved with their full precision at the CU sub-block level at the encoding side as well as at the decoding side. They will be available for the following predictions, as a spatial predictor, then as a temporal one. The initial motion vector, at integer- or 1/4-pel accuracy, is still used for the end of the encoding process of this current AMVP CU, such as for motion vector differential calculation, or for RDO cost calculation, for example.

The first aspects of the aforementioned embodiments comprise refining and saving the motion vectors of AMVP CUs to enhance the motion compensation process and the subsequent predictions.

In another embodiment, it is proposed to choose whether or not to activate the refinement/saving process according to a rate distortion criterion at the encoder side. To that aim, the process presented in FIG. 5 is repeated with and without the refinement/saving process in the same way that it is already repeated with integer- and 1/4-pel accuracy. So, the AMVP encoding process is tested four times: at integer-pel precision with and without refinement/saving and at 1/4-pel accuracy with and without refinement/saving. The final RDO cost check allows selecting the best configuration to be used to code the current AMVP CU. A flag at the CU level is coded in the output bit-stream.

At a decoder, for AMVP CUs, this flag is decoded and set as an input of the motion compensation process which indicates whether or not refinement/saving should be used.

In a further embodiment, the proposed refinement/saving process can be extended to other coding modes.

All AMVP coding modes have the same accuracy limitation constrained by the precision of the transmitted MVD as presented above where the limitations of the prior art AMVP modes was described. So, all the existing AMVP coding modes and additional future ones can benefit from the proposed refinement/saving process.

For example, in the current JEM, a tool called Affine allows using an affine motion model instead of the classical translational motion model. Such an affine model is piloted by 2 motion vectors, called control point motion vectors (CPMVs). These 2 CPMVs allow derivation of an independent motion vector per 4×4 sub-block. In Affine AMVP mode, the CPMVs are at 1/4-pel accuracy, but the generated MVs at a sub-block level are calculated with a finer precision. In some cases, the 2 CPMVs can be equal, then the generated sub-block motion vectors are also equal to the CPMVs. The associated motion compensation becomes equivalent to the classical motion compensation. Thus, in Affine AMVP coding mode, when the 2 CPMVs are identical, it is possible to use the proposed refinement/saving process.

In a preferred embodiment, all the previous embodiments are combined.

Figure 6:
FIG. 6 shows an example of refinement of a quarter-pel AMVP motion vector towards 1/16-pel accuracy.

The refinement of the motion vector of an AMVP CU is described in FIG. 6 and includes the following.

The motion vector of an AMVP CU is initially refined for the whole CU using the FRUC tool with a diamond pattern at 1/16-pel accuracy followed by a cross pattern at 1/16-pel when the incoming MV has 1/4-pel precision, or with steps of a diamond pattern at 1/4-, 1/8- and 1/16-pel accuracy followed by a cross at 1/16-pel when the incoming MV has integer-pel precision.

This refined MV is used as a seed for the sub-block level where the CU is divided into 4×4 sub-blocks. The first column and row of sub-blocks are refined also using the FRUC tool with a square pattern at 1/16-pel accuracy for 1/4-pel incoming MV or with square patterns at 1/8- and 1/16-pel accuracy for integer-pel incoming MV. Then the second and third columns and rows are refined using the average of up to 4 spatial neighboring MVs (from left, top, top-left and top-right neighbors) and the refined MV of the entire CU. Finally, the remaining sub-blocks use the refined MV of the whole CU.

Figure 7:
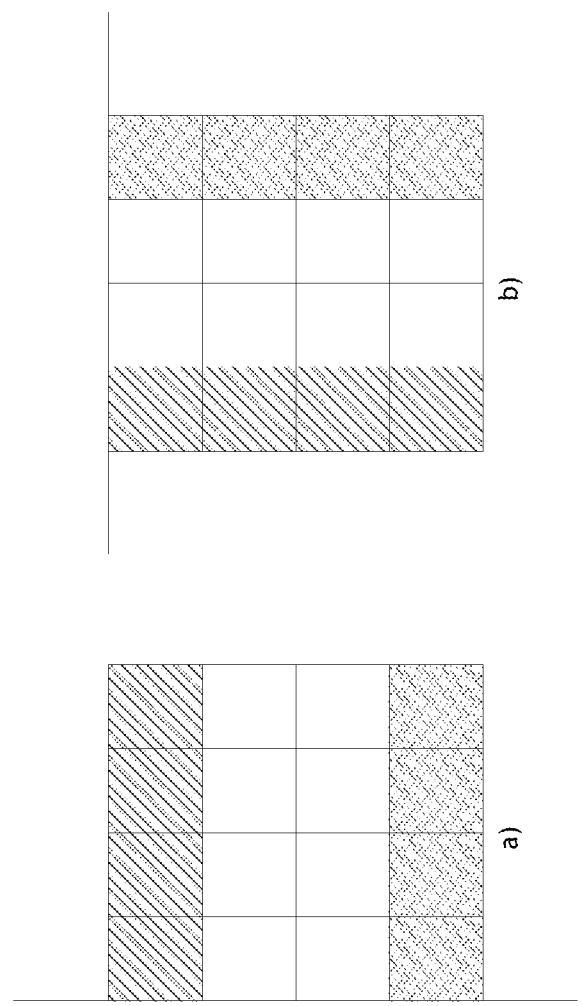
FIG. 7a shows an example of a case of a left border of a frame.
FIG. 7b shows an example of a top border of a frame.

FIG. 7 describes the particular cases where FRUC is not applicable, on left and top borders of the frame. On the left border (or, respectively top), FRUC can only be applied on the first row (or respectively column) of sub-blocks, so the second and third rows (or respectively columns) use the average of neighboring and the whole CU refined MVs, and the remaining rows (or respectively columns) use the whole CU refined MV.

All the refined sub-block motion vectors are saved in the internal storage with their full precision for the following predictions.

For the AMVP mode, this refinement/saving process is put in competition in the RDO loop with the classical AMVP modes (without refinement). A flag is transmitted at the CU level to indicate whether the refinement/saving is to be used.

For the Affine modes, when both control point motion vectors are identical, the refinement/saving process is always used and there is no need to transmit a flag in that case.

To summarize, In AMVP modes, such as classical and affine, since motion vector differentials are transmitted at 1/4-pel precision, and a finer precision is too costly, all the processes are performed with rounded motion vectors at 1/4-pel.

There is a benefit from using 1/16-pel storage and motion compensation, as in the work of the JEM.

For the merge modes, such as classical, FRUC and affine, which do not use motion vector differentials, all the processes can be performed at 1/16-pel accuracy. FRUC and Affine modes generate and calculate the motion vector with a 1/16-pel precision, and classical mode uses neighboring motion vectors that can come from FRUC or Affine with a 1/16-pel precision.

So before the AMVP motion compensation, the aforementioned embodiments refine the motion vector by increasing its precision from ¼-pel to 1/16-pel in such a way that it must be reproducible at the decoder.

One solution described is to pick this extra precision from already coded neighboring motion vectors, from only one position, or as a combination of several, as mentioned earlier.

The second solution is to generate this extra precision by using a template matching method, for example, FRUC.

To improve this method, the CU can be divided into smaller sub-blocks, for example, 4×4, for which the refinements of the motion vector can be performed independently.

For these sub-blocks, the refinement process can be any of the proposed solutions above.

In the particular case of IMV (Integer Motion Vector) that tests, using the RDO, whether to use mvd at 1-pel accuracy, i.e. an AMVP mode at 1-pel precision with all processes at 1-pel, it is possible to use the proposed embodiments but with a larger refinement window ([−15/16, 15/16].

In another embodiment, the refined motion vector can be saved at 1/16-pel for each sub-block so that the next merge modes can use these 1/16-pel accuracy AMVP motion vectors instead of the old ¼-pel ones.

It was also shown how this tool can be incorporated into the codec: (i) as a substitution of the classical AMVP mode, or (ii) as a new competing mode in the RDO.

It was also shown that it is possible to extend this tool to other AMVP modes.

As an example, in Affine AMVP, where in some cases the two motion vectors, generators of the affine motion field, can be equal leading to a classical motion compensation. In these cases, the embodiments can be used to enrich the motion compensation.

Figure 8:
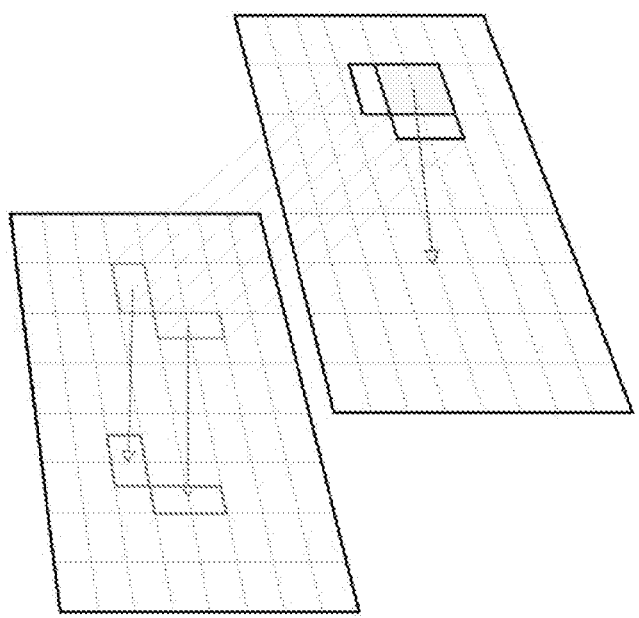
FIG. 8 shows an example of applying the general aspects to a template matching technique.

FIG. 8 shows an example of applying the general aspects to a template matching technique.

Figure 9:
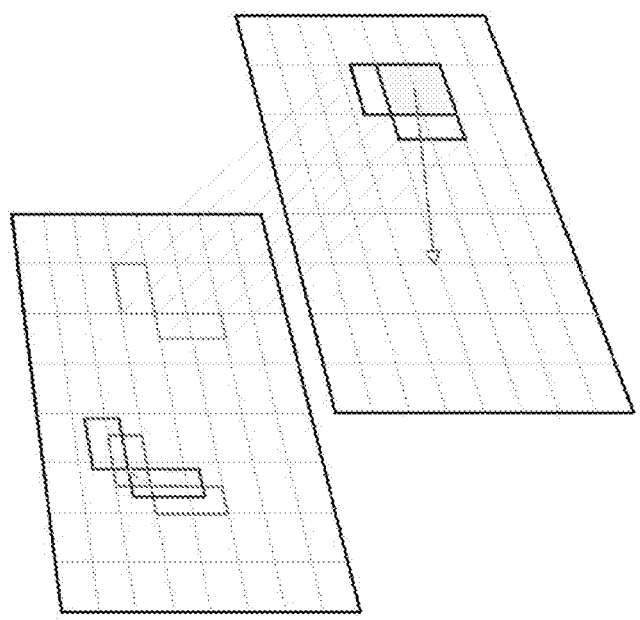
FIG. 9 shows another example of applying the general aspects to a template matching technique.

FIG. 9 shows an example of applying the general aspects to a template matching technique.

Figure 10:
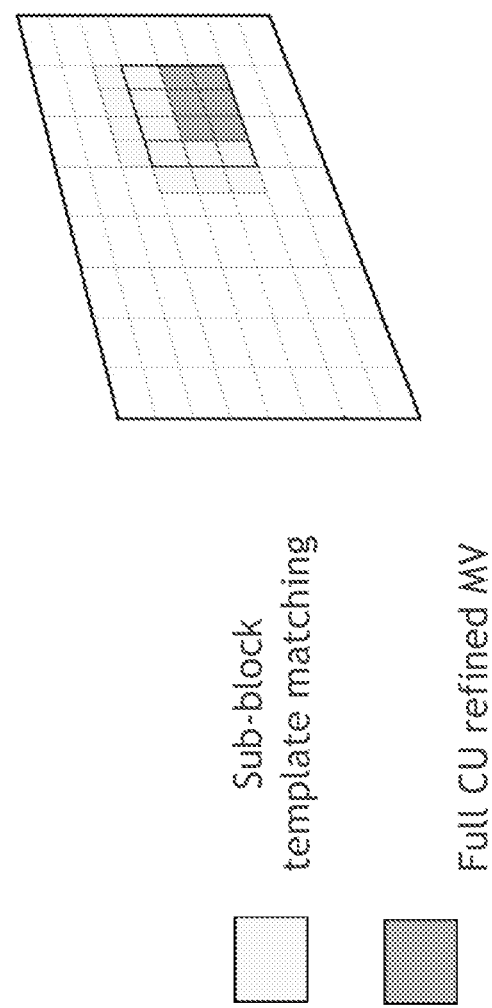
FIG. 10 shows an example of applying a combination of sub-block template matching and a full coding unit refined motion vector with the general described embodiments.

FIG. 10 shows an example of applying a combination of sub-block template matching and a full coding unit refined motion vector.

Figure 11:
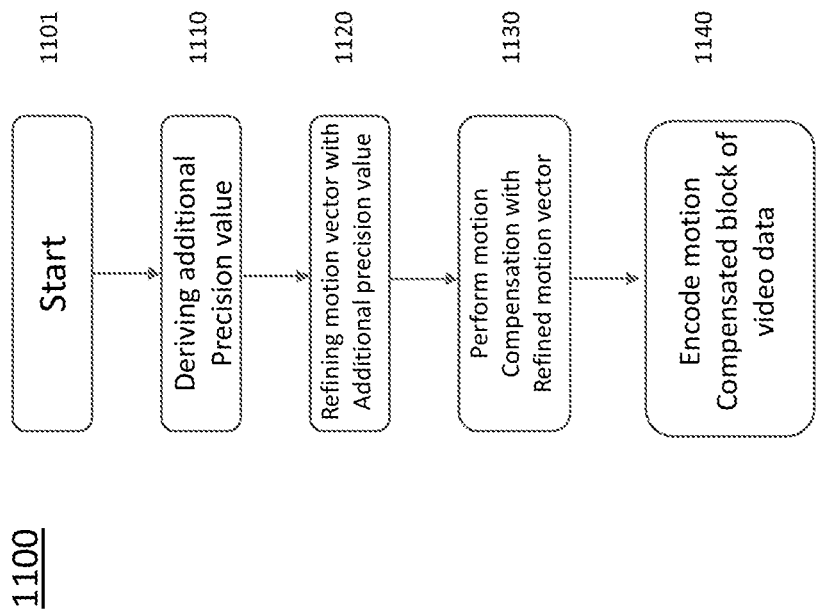
FIG. 11 shows one embodiment of an encoding method using the aspects described.

FIG. 11 shows one embodiment of a method 1100 under the aspects described. The method commences at Start block 1101 and control proceeds to block 1110 for deriving an additional precision value for a motion vector for a block of video data from at least one neighboring block previously encoded. Control proceeds from block 1110 to block 1120 for refining the motion vector by assigning to it the additional precision value. Control then proceeds from block 1120 to block 1130 for performing motion compensation for the block of video data by using the refined motion vector. Control then proceeds from block 1130 to block 1140 for encoding the motion compensated block of video data.

Figure 12:
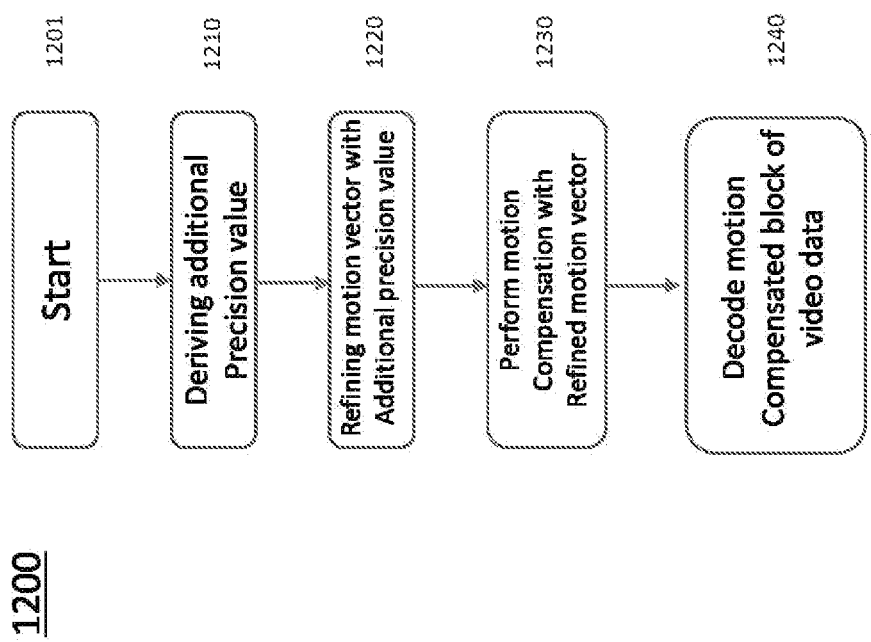
FIG. 12 shows one embodiment of a decoding method using the aspects described.

FIG. 12 shows one embodiment of a method 1200 under the aspects described. The method commences at Start block 1201 and control proceeds to block 1210 for deriving an additional precision value for a motion vector for a block of video data from at least one neighboring block previously decoded. Control proceeds from block 1210 to block 1220 for refining the motion vector by assigning to it the additional precision value. Control then proceeds from block 1220 to block 1230 for performing motion compensation for the block of video data by using the refined motion vector. Control then proceeds from block 1230 to block 11240 for decoding the motion compensated block of video data.

FIG. 13 shows one embodiment of an apparatus 1300 for coding or decoding a block of video data. The apparatus comprises Processor 1310 which has input and output ports and is in signal connectivity with Memory 1320, also having input and output ports. The apparatus can execute any of the aforementioned method embodiments, or variations.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, a method of refinement of motion vector precision for encoding or decoding is provided. In the refinement, additional precision is added by considering the precision of motion vectors from previously encoded and reconstructed, or decoded, neighboring blocks or sub-blocks. This refinement can be combined in several ways, or used in various motion vector prediction modes, such as FRUC or AMP. Other embodiments provide other methods and combinations to increase the precision of motion information to increase coding efficiency.

The invention claimed is:

1. A method, comprising:
obtaining an additional precision value for a motion vector, having an initial precision, for a block of video data from at least one neighboring block previously encoded;
refining the initial precision of the motion vector for the block of video data by assigning the additional precision value to the initial precision of the motion vector for the block of video data;
refining a plurality of motion vectors for a first row and/or column of sub-blocks of the block of video data using the refined motion vector for the block of video data and template matching;
refining a plurality of motion vectors for a second row and/or column of sub-blocks of the block of video data using an average of spatial neighboring motion vectors and the refined motion vector for the block of video data;
performing motion compensation for the block of video data by using the refined motion vectors of the sub-blocks; and
encoding said motion compensated block of video data.

2. The method of claim 1, wherein the additional precision value for the motion vector, having the initial precision, for the block of video data is a lower fractional part of one motion vector, having a finer precision than the initial precision, from one neighboring block previously encoded that is a motion vector predictor for the block.

3. The method of claim 1, wherein the additional precision value for the motion vector, having the initial precision, for the block of video data is a combination of lower fractional parts from at least two motion vectors from at least two neighboring blocks previously encoded.

4. The method of claim 1, wherein the additional precision value is derived from a first N encountered motion vectors corresponding to neighboring blocks that have greater precision than the motion vector, having the initial precision, for the block of video data.

5. The method of claim 1, wherein the additional precision value for the motion vector, having the initial precision, for the block of video data is derived from a first N motion vectors corresponding to neighboring blocks that are closest in value to the motion vector, having the initial precision, for the block of video data.

6. A method, comprising:
obtaining an additional precision value for a motion vector, having an initial precision, for a block of video data from at least one neighboring block previously decoded;
refining the initial precision of the motion vector for the block of video data by assigning the additional precision value to the initial precision of the motion vector for the block of video data;
refining a plurality of motion vectors for a first row and/or column of sub-blocks of the block of video data using the refined motion vector for the block of video data and template matching;
refining a plurality of motion vectors for a second row and/or column of sub-blocks of the block of video data using an average of spatial neighboring motion vectors and the refined motion vector for the block of video data;
performing motion compensation for the block of video data by using the refined motion vectors of the sub-blocks; and
decoding said motion compensated block of video data.

7. The method of claim 6, wherein the additional precision value for the motion vector, having the initial precision, for the block of video data is a lower fractional part of one motion vector, having a finer precision than the initial precision, from one neighboring block previously decoded that is a motion vector predictor for the block.

8. The method of claim 6, wherein the additional precision value for the motion vector, having the initial precision, for the block of video data is a combination of lower fractional parts from at least two motion vectors from at least two neighboring blocks previously decoded.

9. The method of claim 6, wherein the additional precision value for the motion vector, having the initial precision, for the block of video data is derived from a first N encountered motion vectors corresponding to neighboring blocks that have greater precision than the motion vector, having the initial precision, for the block of video data.

10. The method of claim 6, wherein the additional precision value for the motion vector, having the initial precision, for the block of video data is derived from a first N motion vectors corresponding to neighboring blocks that are closest in value to the motion vector, having the initial precision, for the block of video data.

11. An apparatus, comprising:
a memory, and a processor configured to:
obtain an additional precision value for a motion vector, having an initial precision, for a block of video data from at least one neighboring block previously encoded,
refine the initial precision of the motion vector for the block of video data by assigning the additional precision value to the initial precision of the motion vector for the block of video data,
refine a plurality of motion vectors for a first row and/or column of sub-blocks of the block of video data using the refined motion vector for the block of video data and template matching,
refine a plurality of motion vectors for a second row and/or column of sub-blocks of the block of video data using an average of spatial neighboring motion vectors and the refined motion vector for the block of video data,
perform motion compensation for the block of video data by using the refined motion vectors of the sub-blocks, and
encode said motion compensated block of video data.

12. The apparatus of claim 11, wherein the additional precision value for the motion vector, having the initial precision, for the block of video data is a lower fractional part of one motion vector, having a finer precision than the initial precision, from one neighboring block previously encoded that is a motion vector predictor for the block.

13. The apparatus of claim 11, wherein the additional precision value for the motion vector, having the initial precision, for the block of video data is a combination of lower fractional parts from at least two motion vectors from at least two neighboring blocks previously encoded.

14. The apparatus of claim 11, wherein the additional precision value for the motion vector, having the initial precision, for the block of video data is derived from a first N encountered motion vectors corresponding to neighboring blocks that have greater precision than the motion vector, having the initial precision, for the block of video data.

15. The apparatus of claim 11, wherein the additional precision value for the motion vector, having the initial precision, for the block of video data is derived from a first N motion vectors corresponding to neighboring blocks that are closest in value to the motion vector, having the initial precision, for the block of video data.

16. An apparatus, comprising:
a memory, and a processor configured to:
obtain an additional precision value for a motion vector, having an initial precision, for a block of video data from at least one neighboring block previously decoded,
refine the initial precision of the motion vector for the block of video data by assigning the additional precision value to the initial precision of the motion vector for the block of video data,
refine a plurality of motion vectors for a first row and/or column of sub-blocks of the block of video data using the refined motion vector for the block of video data and template matching,
refine a plurality of motion vectors for a second row and/or column of sub-blocks of the block of video data using an average of spatial neighboring motion vectors and the refined motion vector for the block of video data,
perform motion compensation for the block of video data by using the refined motion vectors of the sub-blocks, and
decode said motion compensated block of video data.

17. The apparatus of claim 16, wherein the additional precision value for the motion vector, having the initial precision, for the block of video data is a lower fractional part of one motion vector, having a finer precision than the initial precision, from one neighboring block previously decoded that is a motion vector predictor for the block.

18. The apparatus of claim 16, wherein the additional precision value for the motion vector, having the initial precision, for the block of video data is a combination of lower fractional parts from at least two motion vectors from at least two neighboring blocks previously decoded.

19. The apparatus of claim 16, wherein the additional precision value for the motion vector, having the initial precision, for the block of video data is derived from a first N encountered motion vectors corresponding to neighboring blocks that have greater precision than the motion vector, having the initial precision, for the block of video data.

20. The apparatus of claim 16, wherein the additional precision value for the motion vector, having the initial precision, for the block of video data is derived from a first N motion vectors corresponding to neighboring blocks that are closest in value to the motion vector, having the initial precision, for the block of video data.

* * * * *

UNITED STATES PATENT AND TRADEMARK OFFICE
CERTIFICATE OF CORRECTION

PATENT NO. : 11,070,838 B2
APPLICATION NO. : 16/642566
DATED : July 20, 2021
INVENTOR(S) : Antoine Robert, Fabrice Leleannec and Simon Danten It is certified that error appears in the above-identified patent and that said Letters Patent is hereby corrected as shown below:

On the Title Page

Column 2 (Abstract), Line 10, replace "distorion" with --distortion--.

Signed and Sealed this
Twenty-eighth Day of February, 2023

Katherine Kelly Vidal
*Director of the United States Patent and Trademark Office*